(12) United States Patent
Chien et al.

(10) Patent No.: US 7,515,409 B2
(45) Date of Patent: Apr. 7, 2009

(54) FASTENABLE DOCKING DEVICE WITH FASTENING DEVICE

(75) Inventors: Chih-Wei Chien, Guangdong (CN); Chang-Hsuan Chen, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 394 days.

(21) Appl. No.: 11/308,921

(22) Filed: May 25, 2006

(65) Prior Publication Data
US 2007/0076367 A1 Apr. 5, 2007

(30) Foreign Application Priority Data
Sep. 30, 2005 (CN) ......................... 2005 1 0100084

(51) Int. Cl.
*G06F 1/16* (2006.01)
*G06F 13/00* (2006.01)

(52) U.S. Cl. .................. 361/686; 710/303; 710/304

(58) Field of Classification Search ......... 361/679–686, 361/687, 724–727; 292/95, 121, 124, 128, 292/108, 102, 300, 304, DIG. 61; 248/551, 248/552, 917, 922; 439/131, 374, 929, 352, 439/353, 357, 358; 70/14, 32–34, 57–58, 70/158; D14/300, 434, 439, 440; 710/303, 710/304; 400/88; 312/223.2
See application file for complete search history.

(56) References Cited

U.S. PATENT DOCUMENTS 3,918,751 A * 11/1975 Blake .......................... 292/126
6,069,790 A 5/2000 Howell et al.
6,135,801 A 10/2000 Helot et al.
6,626,686 B1 9/2003 D'Souza et al.
2005/0044898 A1* 3/2005 Park et al. .................. 68/12.26
2005/0047104 A1* 3/2005 Grunow et al. .............. 361/801
2006/0139875 A1* 6/2006 Cheng et al. ................ 361/686

FOREIGN PATENT DOCUMENTS

| CN | 2465223 Y | 12/2001 |
| CN | 2720503 Y | 8/2005 |
| TW | M257473 | 2/2005 |

* cited by examiner

*Primary Examiner*—Jayprakash N Gandhi
*Assistant Examiner*—Nidhi Desai
(74) *Attorney, Agent, or Firm*—Winston Hsu (57) ABSTRACT

A docking device is used for docking a portable computer. The docking device defines an axis along which the portable computer moves between a docking position in the docking device and an undocking position out of the docking device. The docking device includes a hooking member and a resilient mechanism being engaged with the hooking member for providing a restoration force to the hooking member. The hooking member includes a first side surface for being pressed by the portable computer as the portable computer moves towards the casing, along where the portable computer moves from the undocked position to the docked position. A first angle is defined between the first side surface and the axis when the portable computer is in the undocked position.

17 Claims, 8 Drawing Sheets

FASTENABLE DOCKING DEVICE WITH FASTENING DEVICE

FIELD OF THE INVENTION

The present invention generally relates to a docking device and, more particularly, to a fastening device of the docking device for fastening a portable computer to the docking device.

DESCRIPTION OF RELATED ART

In contrast to conventional desktop computers, portable computers have become increasingly popular due to small size and outstanding mobility. In order to decrease size, a typical portable computer substitutes a more compact keyboard for a general keyboard commonly used in a desktop computer. Similarly, instead of a mouse used in a desktop computer, the portable computer uses a point stick, a touch pad, or a trackball as an input member, because such devices are more easily housed therein. However, in practice, the general keyboard and mouse are usually more comfortable and convenient for users than the compact keyboard, the point stick and the like.

Therefore, a docking device for the portable computer is provided to offer comforts and conveniences found in the desktop computer. A typical docking device generally includes many connectors for connecting the portable computer to peripheral devices such as an external monitor, a printer or the like, and many expansion slots for connecting to other drives such as an enhanced graphics adaptor (EGA) card, a network card or the like.

Figure 8:
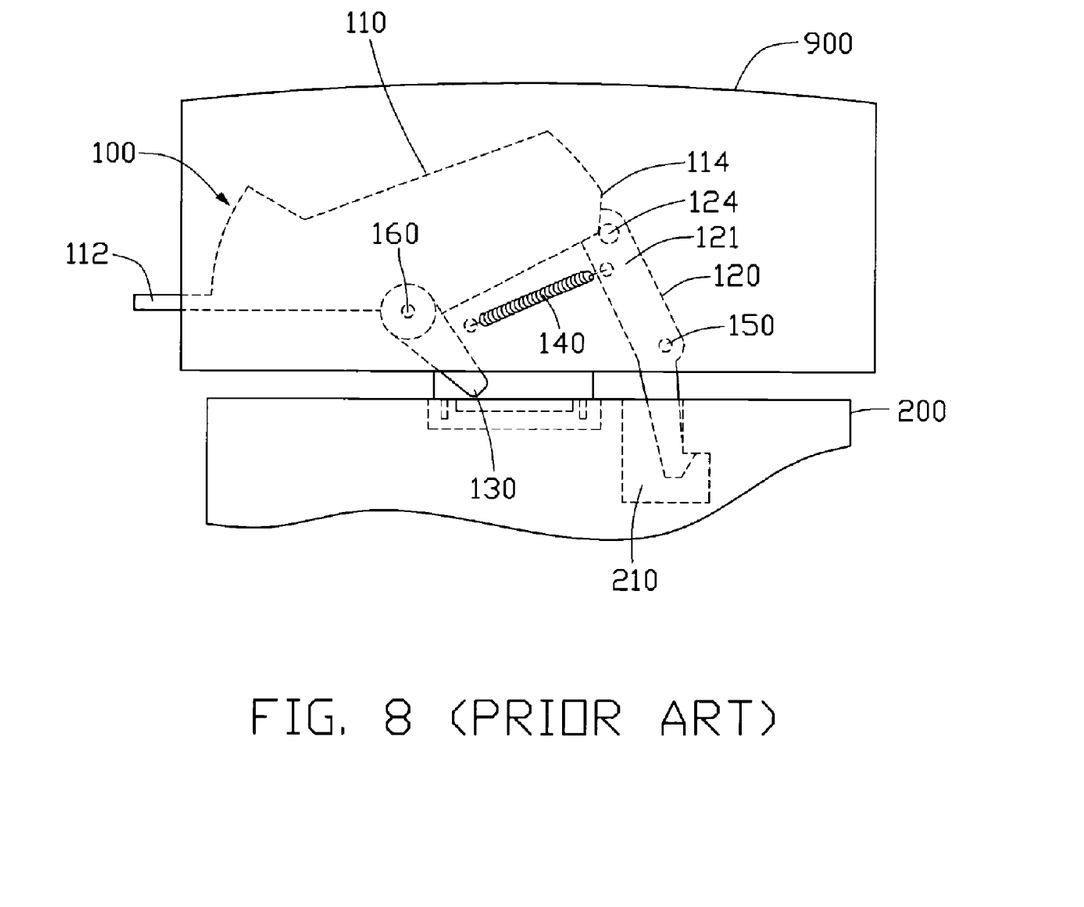
FIG. 8 is a top perspective plan view of a conventional docking device with a device fastening a portable computer.

Referring to FIG. 8, a docking device 900 for a portable computer 200 is described. The docking device 900 includes a fastening device 100 for fastening the portable computer 200 to the docking device 100 and securing an electric contact between the portable computer 200 and the docking device 100.

The fastening device 100 includes a moving arm 110, a latch 120, an eject arm 130, a spring 140, a first shaft 150, and a second shaft 160. Both of the moving arm 110 and the eject arm 130 can pivot around the second shaft 160. The latch 120 is connected to the spring 140 and the first shaft 150, and can pivot around the first shaft 150.

The moving arm 110 includes a handle 112 protruding out of the docking device 900, and a cam surface 114 in contact with the latch 120. The latch 120 includes an arm portion 121, a hooking portion 122 engaging with the portable computer 200, and a cam 124 formed on the arm portion 121. The spring 140 is connected to the arm portion 121 for providing a restoration force thereon. The portable computer 200 defines a locking device 210 for locking the docking device 900 thereon.

In assembly, the latch 120 pivots around the first shaft 150 against the restoration force of the spring 140. The latch 120 is inserted into and engages with the locking device 210 of the portable computer 200. The portable computer 200 is thus fastened to the docking device 900.

In disassembly, the handle 112 is pushed away by operators from the portable computer 200, while both of the moving arm 110 and the eject arm 130 pivot around the second shaft 160 with the cam surface 114 sliding with respect to the cam 124. The latch 120 is pushed to pivot around the first shaft 150, with the hooking portion 122 disengaging the locking device 210. Therefore, the fastening device 100 is detached from the portable computer 200.

However, the structure of the aforementioned fastening device is so complex that it needs an even more complex producing procedure.

Therefore, a fastening device is needed in the industry to address the aforementioned deficiencies and inadequacies.

SUMMARY OF THE INVENTION

A docking device is used for docking a portable computer. The docking device defines an axis along which the portable computer moves between a docking position in the docking device and an undocking position out of the docking device. The docking device includes a hooking member and a resilient mechanism being engaged with the hooking member for providing a restoration force to the hooking member. The hooking member includes a first side surface for being pressed by the portable computer as the portable computer being moved towards the casing, along where the portable computer being moved from the undocked position to the docked position. A first angle is defined between the first side surface and the axis when the portable computer is in the undocked position.

Other systems, methods, features, and advantages of the present fastening device will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present fastening device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe preferred embodiments of the present fastening device and a preferred embodiment of the present docking device.

Figure 1:
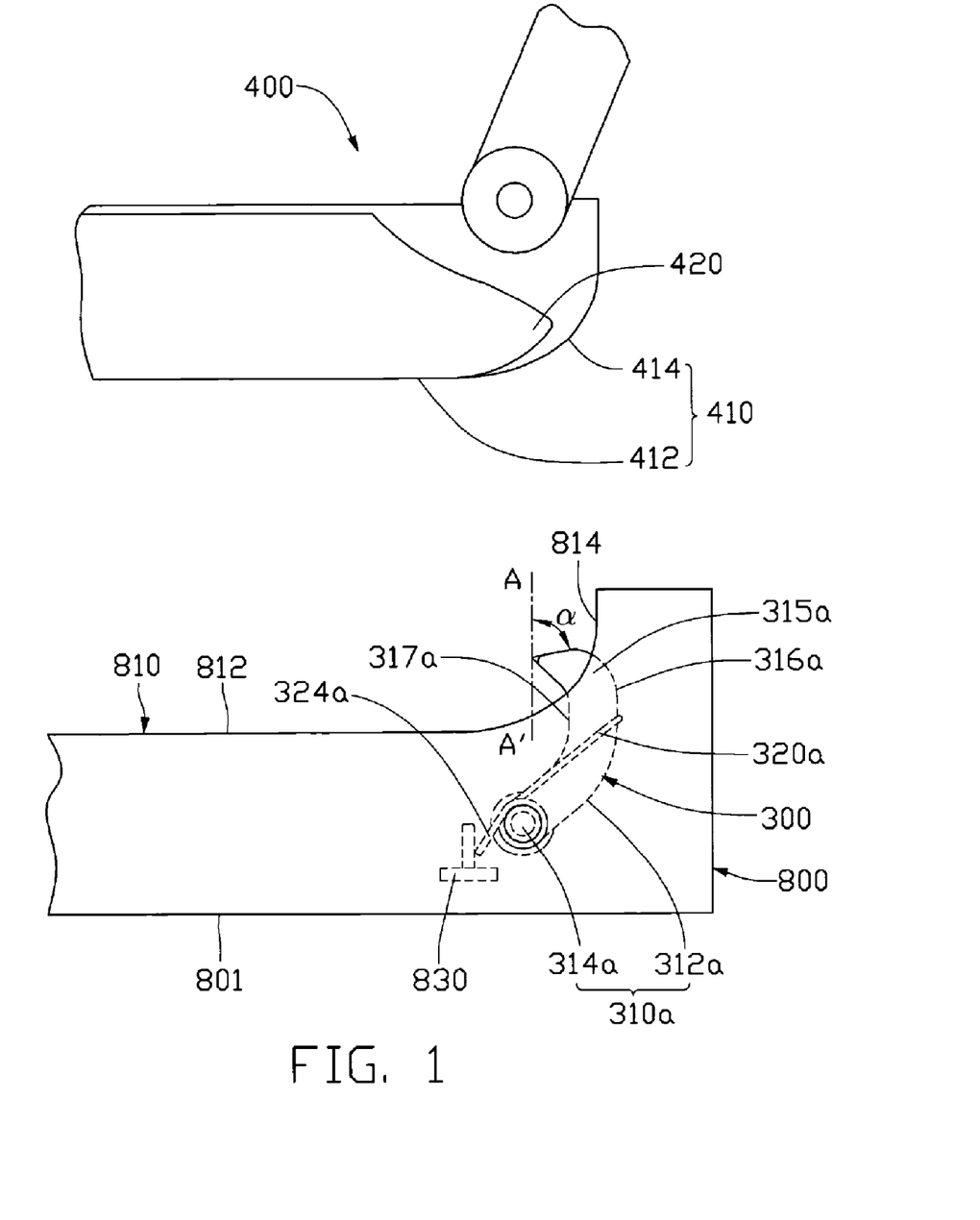
FIG. 1 is an exploded, side view of a portable computer and a docking device for docking the portable computer in accordance with an exemplary embodiment, the docking device including a fastening device.

Referring to FIG. 1, a docking device 800 for docking a portable computer 400 thereon is illustrated. The docking device defines an axis AA' along where the portable computer 400 moves between a docking position for being assembled in the docking device 800 and an undocking position for being disassembled out of the docking device 800. In this embodiment, the axis AA' is substantially vertically extending. The portable computer 400 includes a housing 410 and a locking member 420 formed on a side of the housing 410 for engaging with the docking device 800. The housing 410 includes a first flat bottom surface 412 and a first curved surface 414 extending from a rear edge of the first flat bottom surface 412. The docking device 800 includes a casing 801. The casing 801 includes a supporting surface 810 for supporting the portable computer 400, a locating member 830, and a fastening device 300a pivotally mounted in the casing 801. The supporting surface 810 includes a second flat surface 812 corresponding to the first flat bottom surface 412 and a second curved surface 814 corresponding to the first curved surface 414. The fastening device 300a partially protrudes out of the docking device 800 through the second curved surface 814.

Figure 2:
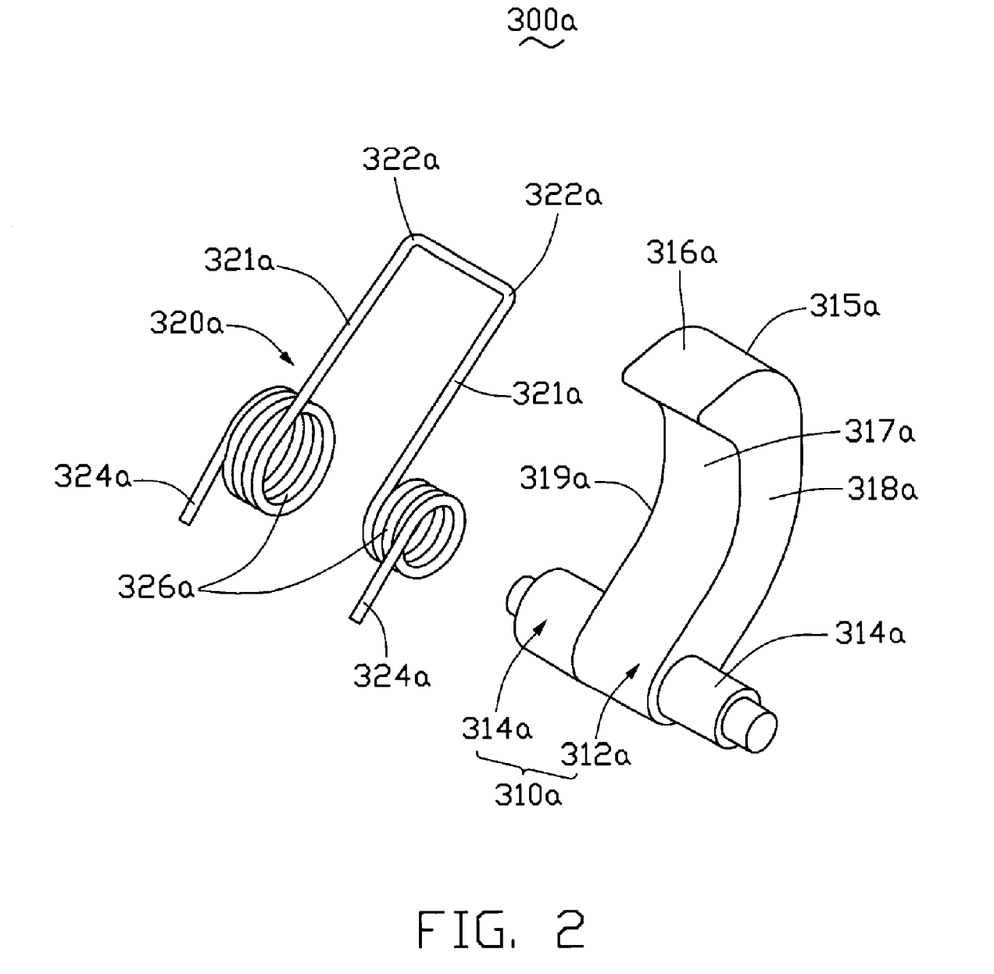
FIG. 2 is an exploded, isometric view of the fastening device in accordance with a first embodiment.

Referring also to FIG. 2, the fastening device 300a in accordance with a first embodiment includes a hooking member 310a and a resilient mechanism 320a. The resilient mechanism 320a is fastened in the docking device 800 via the locating member 830 and configured for providing a restoration force to the hooking member 310a.

The hooking member 310a includes an arm 312a with two opposite ends, and a pair of shafts 314a integrally formed on one end of the arm 312a. The other end of the arm 312a includes a hook 315a for engaging with the locking member 420 of the portable computer 400. Furthermore, the arm 312a also includes four side surfaces 316a, 317a, 318a, and 319a, wherein the third side surface 318a and the fourth side surface 319a from which the two shafts 314a extend, are opposite and parallel to each other. The first side surface 316a and the second side surface 319a are respectively perpendicularly interconnected to the third side surface 318a and the fourth side surface 319a, and joined at two opposite ends of the arm 312. The first side surface 316a is configured for being pressed by the portable computer 400 as the portable computer 400 moves towards the casing 801. An angle α is defined between the first side surface 316a at the hook 315 and the axis AA' to make the docking operation easier. In this embodiment, the angle α locates in a preferred range from 82.6 degrees to 85.6 degrees, for example, 84.1 degrees.

The resilient mechanism 320a includes two resilient members 321a. Each resilient member 321a includes a first end 322a, a second end 324a, and an annular part 326a. The annular part 326a is a twisted loop of the resilient member 321a. The first end 322a and the second end 324a extend from the annular part 326a in a direction toward each other. Furthermore, the first ends 322a of the two resilient members 320a are connected to each other.

Figure 3:
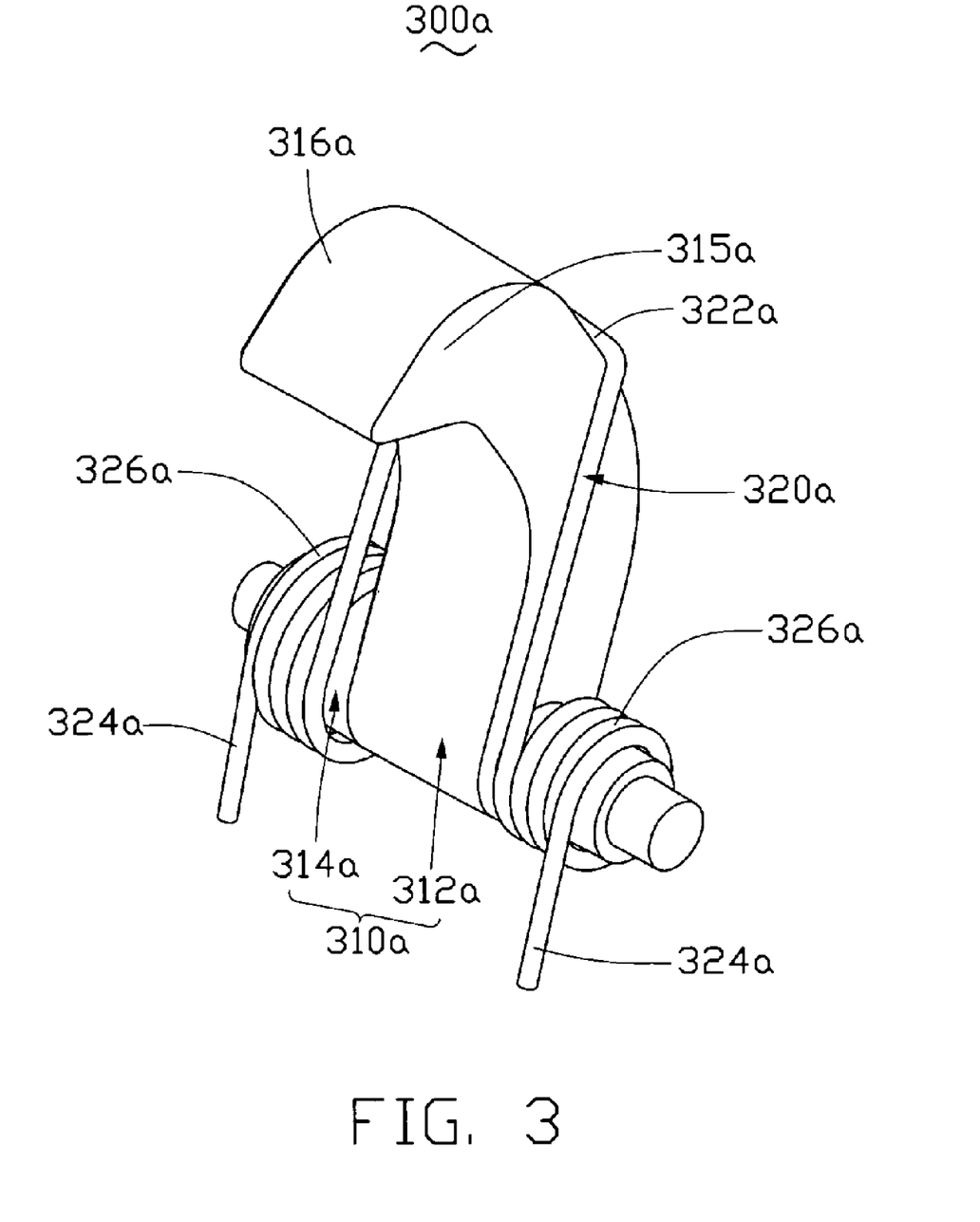
FIG. 3 is an assembled, isometric view of the fastening device of FIG. 2.

Referring also to FIG. 3, each annular part 326a is coiled around the corresponding shaft 314a, with the first ends 322a leaning against the first side surface 316a and the second ends 324a fastened on the locating member 830.

Figure 4:
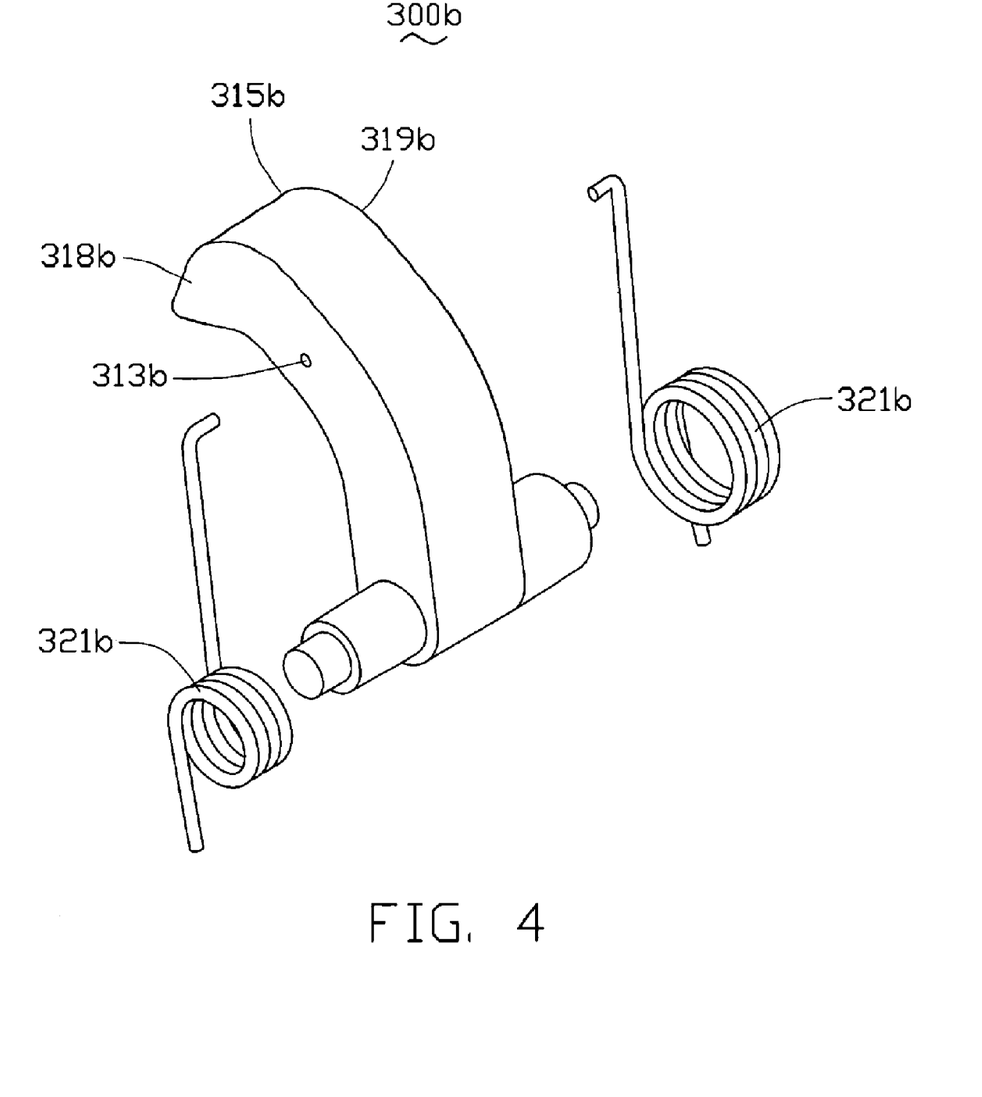
FIG. 4 is an exploded, isometric view of the fastening device in accordance with a second embodiment.
Figure 5:
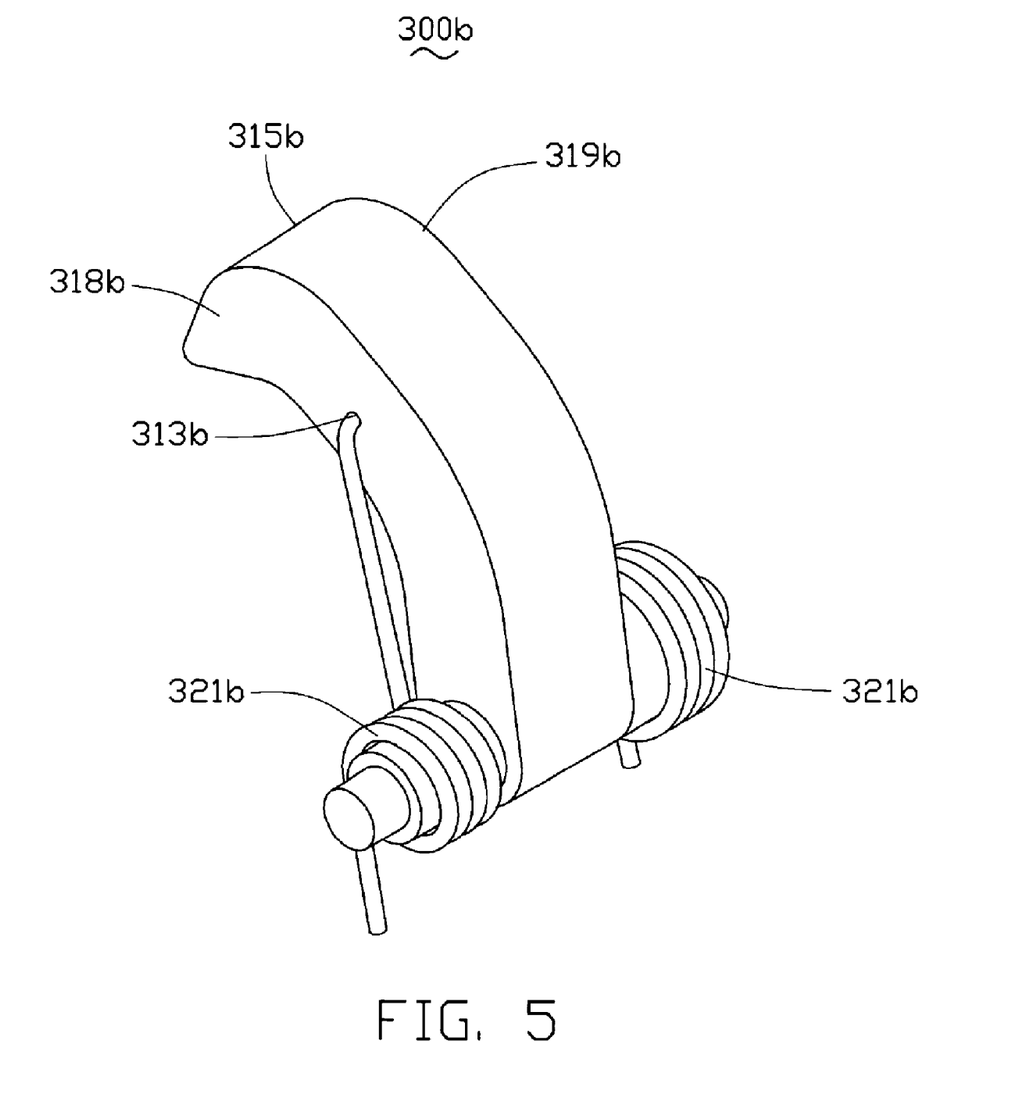
FIG. 5 is an assembled, isometric view of the fastening device of FIG. 4.

Referring to FIGS. 4 and 5, the fastening device 300b in accordance with a second embodiment defines two locating holes 313b, one in a third side surface 318b and another in a fourth side surface 319b at the hook 315b. Two resilient members 321b extends along the arm 312b to be correspondingly inserted into the locating hole 313b.

Figure 6:
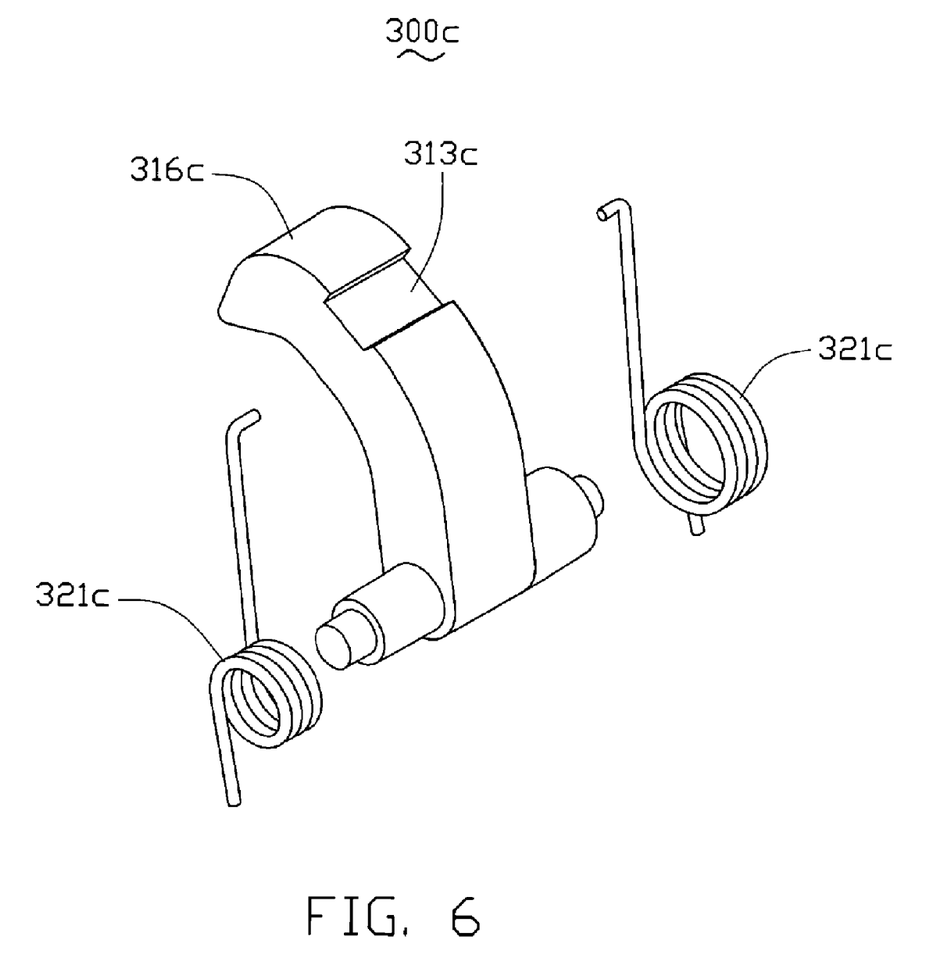
FIG. 6 is an exploded, isometric view of the fastening device in accordance with a third embodiment.

Referring to FIG. 6, a fastening device 300c in accordance with a third embodiment defines a cutout 313c recessed in a first side surface 316c. Two resilient members 321c are restricted in the cutout 313c.

In aforementioned three embodiments, the fastening device 300a, 300b and 300c have approximate structures that each of them is composed of a hooking member and a resilient mechanism.

Figure 7:
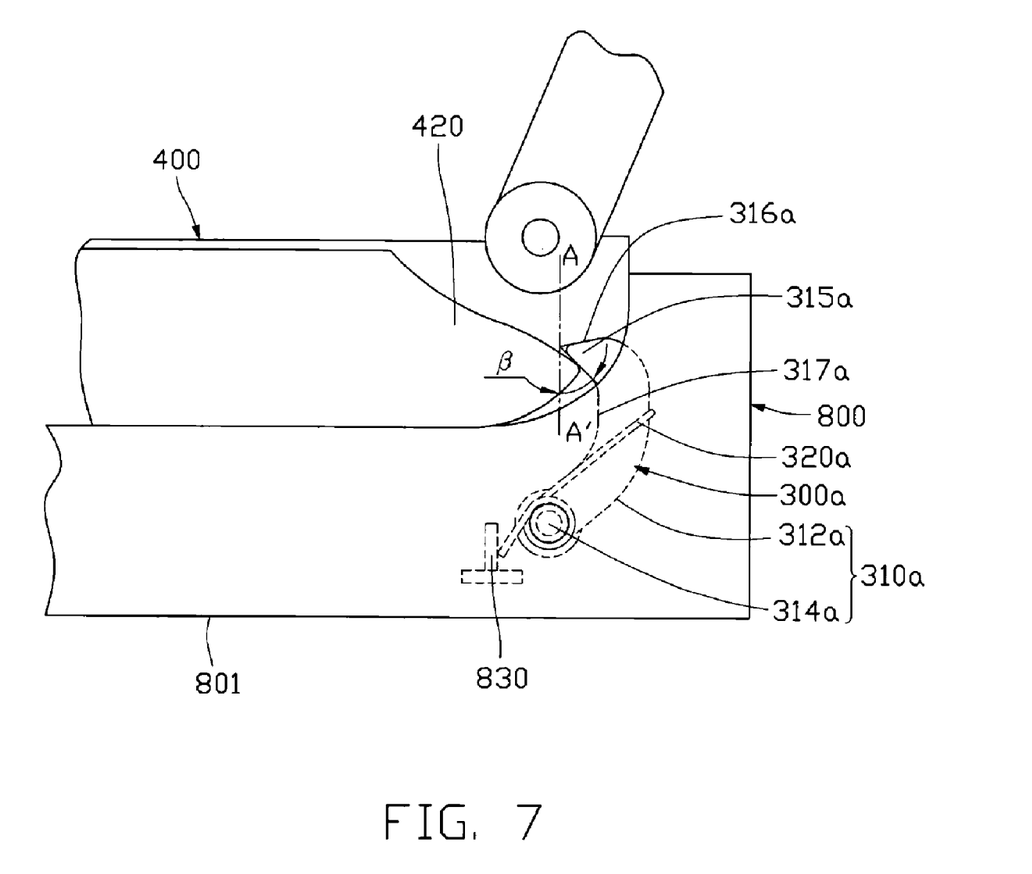
FIG. 7 is an assembled, side view of the portable computer and the docking device of FIG. 1.

Referring to FIGS. 1 and 7, in assembly, the fastening device 300a is engaged into the docking device 800, with the shaft 314a pivotally mounted in the docking device 800. The portable computer 400 is put onto the docking device 800 along the axis AA'. When the locking member 420 is pushed down to press the first side surface 316a, the hook 315a is pushed into the docking device 800. The first flat bottom surface 412 abuts the second flat surface 812 and the first curved surface 414 abuts the second curved surface 814. Finally, the hook 315a is restored to engage with the locking member 420 by the resilient members 321a. Thus, the portable computer 400 is docked by the docking device 800.

The second side surface 319a is configured for being pushed by the portable computer 400 as the portable computer moves away from the casing 801. An angle β is defined between the second side surface 317a at the hook 315 and the axis AA' to make the undocking operation easier. In this embodiment, the angle β locates in a preferred range from 37 degrees to 43 degrees, for example, 40 degrees. In disassembly, the locking member 420 is pushed up to press the second side surface 319a, then the hook 315a is pushed into the docking device 800. After the locking member 420 is taken off from the hook 315a, the hook 315a is restored by the resilient member 321a. Thus, the portable computer 400 is detached from the docking device 800.

The fastening device 300a use the hooking member 310a and the resilient mechanism 320a instead of a relative complex structure of the aforementioned conventional fastening device to achieve the fastening operation. Thus, the fastening device 300a will have a lower cost production because it has lesser components and assembly procedures.

It should be emphasized that the above-described preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A docking device for docking a portable computer, the docking device defining an axis along where the portable computer moves between a docking position in the docking device and an undocking position out of the docking device, the docking device comprising:

a casing;

a hooking member pivotally mounted in the casing, the hooking member comprising a first side surface configured for being pressed by the portable computer as the portable computer moves towards the casing, a first angle being defined between the first side surface and the axis when the portable computer is in the undocking position, and the first angle being in a range from 82.6 degrees to 85.6 degrees; and a resilient mechanism being engaged with the hooking member for providing a restoration force to the hooking member.

2. The docking device according to claim 1, wherein the hooking member comprises a second side surface configured for being pushed by the portable computer as the portable computer moves away from the casing, and a second angle is defined between the second side surface and the axis when the portable computer is in the docking position.

3. The docking device according to claim 2, wherein the second angle locates in a range from 37 degrees to 43 degrees.

4. The docking device according to claim 1, wherein the hooking member comprises a hook for engaging with the portable computer.

5. The docking device according to claim 4, wherein the hooking member comprises a shaft for engaging with the resilient mechanism.

6. The docking device according to claim 5, wherein the resilient mechanism comprises at least one resilient member, and the resilient member is coiled around the shaft.

7. The docking device according to claim 6, wherein the docking device comprises a locating member, and the resilient member comprises a first end and a second end such that the first end and the second end engage with the hook and the locating member respectively.

8. The docking device according to claim 7, wherein at least one locating hole is defined in the hook, and the resilient member is engaged into the locating hole.

9. The docking device according to claim 7, wherein a cutout is defined in the first side surface, and the resilient member is restricted in the cutout.

10. The docking device according to claim 7, wherein the docking device comprises two resilient members, and the first ends of the two resilient members are connected together and leans against the first side surface.

11. A system comprising:
a portable computer; and
a docking device docking the portable computer therein, the docking device defining an axis along where the portable computer moves between a docking position for being assembled in the docking device and an undocking position for being disassembled out of the docking device, the docking device comprising:
a casing receiving the portable computer;
a hooking member pivotally mounted in the casing, the hooking member comprising a side surface pressing the portable computer, an angle being defined between the side surface and the axis when the portable computer is in the docking position, and another side surface configured for being pressed by the portable computer as the portable computer moves towards the casing, and another angle being defined between the another side surface and the axis when the portable computer is in the undocking position, the another angle being in a range from 82.6 degrees to 85.6 degrees; and
a resilient mechanism being engaged with the hooking member for providing a restoration force to the hooking member.

12. The system according to claim 11, wherein the angle is in a range from 37 degrees to 43 degrees.

13. The system according to claim 11, wherein the portable computer comprises a housing for contacting with the docking device.

14. The system according to claim 13, wherein the portable computer comprises a locking member for engaging with the docking device.

15. The system according to claim 14, wherein the docking device comprises a supporting surface for supporting the housing.

16. The system according to claim 15, wherein the hooking member comprises a hook for engaging with the locking member, and a shaft for engaging with the resilient mechanism.

17. The system according to claim 16, wherein the resilient mechanism comprises at least one resilient member, and the resilient member is coiled around the shaft.

* * * * *